(12) United States Patent
Xu et al.

(10) Patent No.: US 12,088,399 B2
(45) Date of Patent: Sep. 10, 2024

(54) COMMUNICATION METHOD AND COMMUNICATION APPARATUS

(71) Applicant: GUANGDONG OPPO MOBILE TELECOMMUNICATIONS CORP., LTD., Dongguan (CN)

(72) Inventors: Weijie Xu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 370 days.

(21) Appl. No.: 17/590,253

(22) Filed: Feb. 1, 2022

(65) Prior Publication Data

US 2022/0158720 A1    May 19, 2022

Related U.S. Application Data

(63) Continuation of application No. PCT/CN2019/099313, filed on Aug. 5, 2019.

(51) Int. Cl.
*H04B 1/60* (2006.01)
*H04B 7/185* (2006.01)

(52) U.S. Cl.
CPC .................. *H04B 7/18513* (2013.01)

(58) Field of Classification Search
CPC ............ H04B 7/18513; H04B 7/15528; H04B 7/18519; H04B 7/18543; H04B 7/18552; H04B 17/201; H04B 17/21
See application file for complete search history.

(56) References Cited

U.S. PATENT DOCUMENTS

| 2013/0064270 A1* | 3/2013 | Weill | G01S 19/258 |
| | | | 375/150 |
| 2014/0328872 A1* | 11/2014 | Wang | A61K 36/07 |
| | | | 424/195.15 |

FOREIGN PATENT DOCUMENTS

| CN | 103298136 A | 9/2013 |
| CN | 108834211 A | 11/2018 |
| CN | 109804669 A | 5/2019 |
| WO | 2018109411 A1 | 6/2018 |

OTHER PUBLICATIONS

Extended European Search Report dated Jun. 15, 2022 received in European Patent Application No. EP19940457.5.

(Continued)

*Primary Examiner* — Tuan Pham
(74) *Attorney, Agent, or Firm* — Sheppard, Mullin, Richter & Hampton LLP

(57) ABSTRACT

The present disclosure provides a communication method, including: receiving a Doppler parameter; and determining a time compensation amount for a signal based on the Doppler parameter. When the method is performed by a terminal device, the terminal device can receive the Doppler parameter from a satellite or a satellite measurement and control center. When the method is performed by a satellite, the satellite can receive the Doppler parameter from a satellite measurement and control center. Therefore, the apparatus performing the method does not need to calculate the Doppler parameter locally, thereby reducing the burden on the apparatus.

16 Claims, 3 Drawing Sheets

(56) References Cited

OTHER PUBLICATIONS

CATT:"PRACH design and UL timing advance" , 3GPP Draft; RI-1906325, 3rd Generation Partnership Project (3GPP), Mobile Competence Centre ; 650, Route Des Lucioles; F-06921 Sophia-Antipolis Cedex ; France vol. RAN WG1, No. Reno, USA; May 13, 2019-May 17, 2019, May 13, 2019 (May 13, 2019), XP051727775.

Nokia et al:"Doppler Compensation, Uplink Timing Advance and Random Access in NTN" , 3GPP Draft; RI-1906087, 3rd Generation Partnershipproject (3GPP), Mobile Competence Centre ; 650, Route Des Lucioles; F-06921 Sophia-Antipoliscedex ; France vol. RAN WG1, No. Reno, USA; May 13, 2019-May 17, 2019,May 13, 2019 (May 13, 2019), XP051727544.

International Search Report and Written Opinion dated Apr. 27, 2020 in International Application No. PCT/CN2019/099313. English translation is attached.

Thales et al. "NR-NTN: TP for Chap 7.3 NR modifications to support NTN", 3GPP TSG RAN Meeting #80 RP-180658, Jun. 4, 2018, section 7.3, 37 pages.

Communication pursuant to Article 94(3) EPC for European application 19940457.5 mailed May 30, 2023.

Communication pursuant to Article 94(3) EPC for European application 19940457.5 mailed Feb. 20, 2023.

* cited by examiner

COMMUNICATION METHOD AND COMMUNICATION APPARATUS

CROSS-REFERENCE TO RELATED APPLICATIONS

The present application is a continuation of International Application No. PCT/CN2019/099313 filed on Aug. 5, 2019, which is hereby incorporated by reference in its entirety.

TECHNICAL FIELD

The present disclosure relates to communication technology, and more particularly, to a communication method and a communication apparatus.

RELATED ART

The Non-Terrestrial Network (NTN) is a communication scenario of the 5th Generation (5G) mobile communication system. In the NTN, a network device that receives signals transmitted by a terminal device is no longer a base station fixed on the ground, but a network device in the air, such as a satellite.

The moving speed of the satellite is very high, resulting the distance between the satellite and the terminal device located on the ground varying very quickly. For example, the rate of change of the distance between a Low Earth Orbit (LEO) satellite and a terminal device be up to 7 kilometers per second (km/s). Therefore, the signal received by the receiver in the NTN will have a strong Doppler effect, i.e., the time length of the signal received by the receiver will be compressed or stretched when compared with the time length of the signal transmitted by the transmitter.

In order to reduce the adverse impact of the Doppler effect on the time accuracy of the signal, one method is for the terminal device to estimate a change value of the time length of the signal based on orbit information of the satellite, so as to facilitate time compensation for the uplink signal. In addition to requiring the terminal device to perform complex calculations based on the orbit information, the above method requires the terminal device to have advanced timing capabilities and positioning capabilities, which brings a significant burden to the terminal device.

SUMMARY

The present disclosure provides a communication method and a communication apparatus, capable of reducing the burden of calculating time compensation at a terminal device or a network device.

In a first aspect, a communication method is provided. The communication method includes: receiving a Doppler parameter; and determining a time compensation amount of a signal according to the Doppler parameter.

In a second aspect, a communication apparatus is provided. The communication apparatus is configured to perform the method in the above first aspect.

In particular, the communication apparatus may include functional modules configured to perform the method in the above first aspect.

In a third aspect, a terminal device is provided. The terminal device includes a processor and a memory. The memory is configured to store a computer program, and the processor is configured to invoke and execute the computer program stored in the memory to perform the method in the above first aspect.

In a fourth aspect, a network device is provided. The network device includes a processor and a memory. The memory is configured to store a computer program, and the processor is configured to invoke and execute the computer program stored in the memory to perform the method in the above first aspect. The network device may be, for example, a satellite.

In a fifth aspect, a chip is provided for implementing the method in the above first aspect.

In particular, the chip includes a processor configured to invoke and execute a computer program from a memory, to cause a device provided with the chip to perform the method in the above first aspect.

In a sixth aspect, a computer-readable storage medium is provided. The computer-readable storage medium stores a computer program that causes a computer to perform the method in the above first aspect.

In a seventh aspect, a computer program product is provided. The computer program product includes computer program instructions that cause a computer to perform the method in the first aspect.

In an eighth aspect, a computer program is provided. The computer program, when executed on a computer, causes the computer to perform the method in the above first aspect.

DESCRIPTION OF EMBODIMENTS

The technical solutions in the embodiments of the present disclosure will be described below with reference to the drawings in the embodiments of the present disclosure. Obviously, the described embodiments are a part of the embodiments of the present disclosure, not all of the embodiments. Based on the embodiments in the present disclosure, all other embodiments obtained by those of ordinary skill in the art without inventive efforts shall fall within the scope of the present disclosure.

Figure 1:
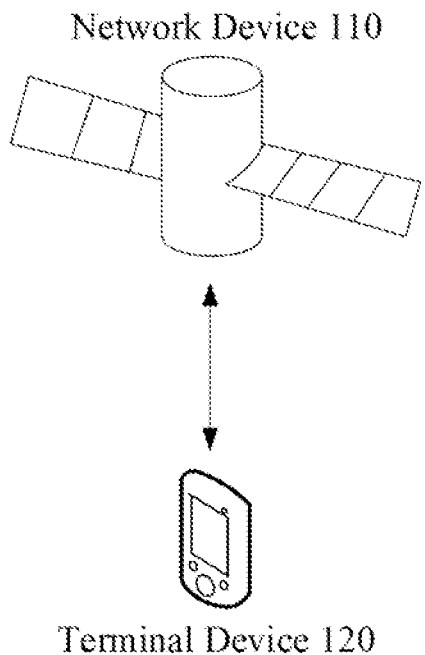
FIG. 1 is a schematic diagram showing a communication system where the present disclosure can be applied.

FIG. 1 is a schematic diagram of a communication system where the present disclosure can be applied. The communication system 100 includes a network device 110 and a terminal device 120.

The network device 110 is a network device in the air, which may be a High Altitude Platform Station (HAPS) with a wireless communication function. The HAPS may be a hot air balloon, an airplane, a satellite, or any other aerial vehicle. When the network device 110 is a satellite for example, the network device 110 can be an LEO satellite, a Medium Earth Orbit (MEO) satellite, or a Geostationary Earth Orbit (GEO) satellite. Among them, the LEO satellite and the MEO satellite have operation periods different from the rotation period of the earth and cannot remain relatively stationary with respect to the earth. Therefore, the LEO satellite and the MEO satellite can also be referred to as Non-Geostationary Earth Orbit (NGEO) satellites.

The terminal device 120 may be a mobile terminal device or a fixed terminal device. For example, the terminal device 120 may be a handheld device with a wireless communication function, a vehicle-mounted device, a wearable device, a computing device, or any other processing device connected to a wireless modem, including for example, a User Equipment (UE) defined by the 3rd Generation Partnership Project (3GPP), a Mobile Station (MS), a soft terminal, a home gateway, a set-top box, etc.

The bidirectional arrow line in FIG. 1 indicates signals between the network device 110 and the terminal device 120. When the network device 110 is a satellite, the satellite can transmit downlink data to the terminal device 120. Here, the downlink data can be transmitted to the terminal device 120 after channel coding, modulation, and mapping. The terminal device 120 can also transmit uplink data to the satellite base station. The uplink data can also be transmitted to the satellite after channel coding, modulation, and mapping. The present disclosure is not limited to any communication mode between the network device 110 and the terminal device 120.

The location of the network device 110 may be referred to as a space segment, and the location of the terminal device 120 may be referred to as a user segment. In at least one embodiment, the communication system 100 may also include a ground segment (not shown in FIG. 1), such as a satellite measurement and control center, a Network Control Center (NCC), various gateways, and so on.

The satellite measurement and control center has functions such as maintaining, monitoring, and controlling the satellite's orbital position and attitude, and managing the satellite's ephemeris. The NCC has network management functions to handle user registration, identity verification, billing, and the like. In some satellite communication systems, the satellite measurement and control center and the NCC may be combined into one. The gateways have functions such as call processing, switching, and interfacing with a ground communication network. The ground communication network is a component of the ground segment, and is configured to transmit satellite data packets to the terminal device 120 via a core network. That is, the satellite can communicate with the terminal device 120 directly, or indirectly via the ground segment. The ground communication network can be a Public Switched Telephone Network (PSTN), a Public Land Mobile Network (PLMN) or any other private network. Different ground communication networks require gateways to have different gateway functions.

In some satellite communication systems, the space segment of the satellite communication system can have a multi-layer structure composed of a management satellite and one or more service satellites. In the network of a multi-layered satellite communication system, the space segment can include one or more management satellites and service satellites managed by the management satellites. The satellites as used in the present disclosure are not limited to management satellites or service satellites.

Figure 2:
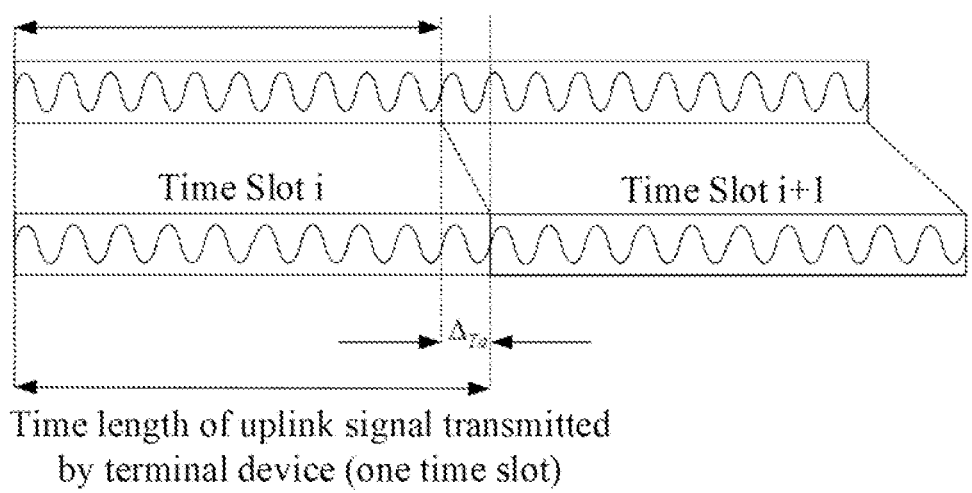
FIG. 2 is a schematic diagram showing a Doppler effect.

FIG. 2 is a schematic diagram of a Doppler effect. For simplicity, hereinafter, a network device and a terminal device will be described without reference numerals.

A time length of an uplink signal transmitted by a terminal device is one time slot, as shown in time slot i. When a satellite is moving towards the terminal device, the distance between the satellite and the terminal device gradually decreases, and the time length for the uplink signal to reach the satellite is compressed. The time length of the signal received by the terminal device is smaller than one time slot, and the difference is shown as $\Delta_{Ta}$ in FIG. 2. This effect is the Doppler compression effect.

In addition, FIG. 2 also shows an influence of the Doppler effect on a Timing Advance (TA). Assuming that the TA of the uplink signal in time slot i is equal to 0, due to the existence of the Doppler compression effect, the uplink signal in time slot i+1 will arrive at the satellite in advance. If the satellite detects the uplink signal at the predetermined time (the time at which the uplink signal would arrive at the satellite without the Doppler effect), it will miss a part of the uplink signal, which may cause data transmission failure.

Similarly, if the satellite is moving away from the terminal device, the distance between the satellite and the terminal device gradually increases, and the time length for the uplink signal to reach the satellite is stretched. The time length of the signal received by the terminal device is greater than one time slot. This effect is the Doppler stretch effect or the inverse Doppler compression effect. This is not shown in FIG. 2.

In either case, the Doppler effect will result in a degradation of the time accuracy of the signal, or even communication failure. In order to reduce the adverse impact of the Doppler effect on the time accuracy of the signal, it is necessary to perform time compensation for the signal at the transmitter or the receiver.

In the following, a communication method, i.e., a method for time compensation for a signal in an NTN, according to the present disclosure, will be introduced in detail.

Figure 3:
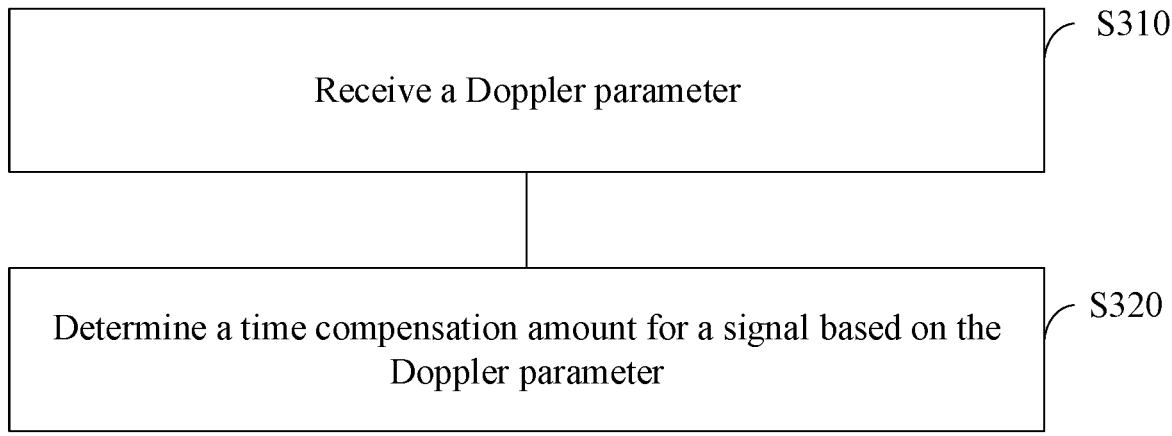
FIG. 3 is a schematic diagram showing a communication method according to the present disclosure.

As shown in FIG. 3, a method 300 includes:

at S310, receiving a Doppler parameter; and at S320, determining a time compensation amount for a signal based on the Doppler parameter.

In the present disclosure, the Doppler parameter refers to a parameter related to a Doppler effect, including for example, a change amount of a distance between a satellite and a terminal device per time unit, or a change amount of a phase of the signal between the satellite and the terminal device per time unit, or a change amount of a time length of the signal between the satellite and the terminal device per time unit.

The apparatus performing the method 300 can determine the change amount of the time length of the signal per time unit based on the received Doppler parameter, determine the time compensation amount for the signal based on the change amount, and transmit or receive the signal.

Figure 4:
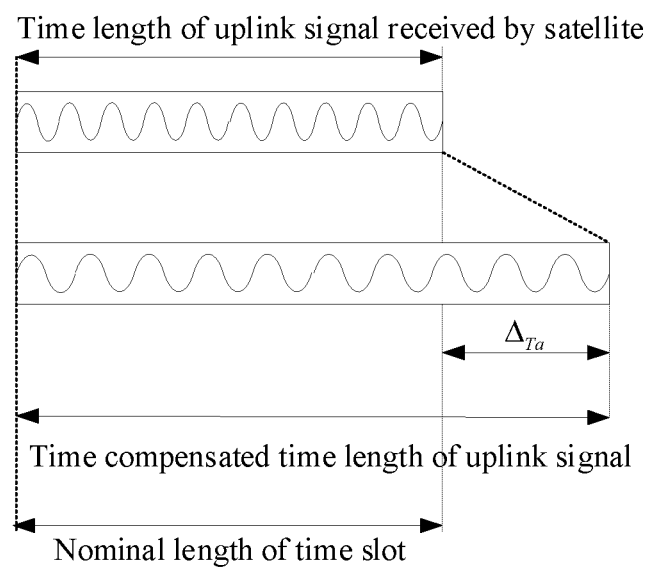
FIG. 4 is a schematic diagram showing a method for time compensation for a signal according to the present disclosure.

For example, a predetermined time length (or "nominal time length") of an uplink signal is one time slot (slot). When the satellite is moving from the apogee of its orbit towards the perigee, the time length of the received uplink signal is compressed, and the terminal device can perform time compensation for the uplink signal, i.e., to increase the signal time length of the uplink signal to ensure that the time length of the uplink signal received by the satellite is one time slot. This scheme is shown in FIG. 4. In FIG. 4, the time compensation amount is $\Delta_{Ta}$. When the satellite is moving from the perigee of its orbit towards the apogee, the time length of the received uplink signal is stretched, and the terminal device can perform time compensation for the uplink signal, i.e., to decrease the signal time length of the uplink signal to ensure that the time length of the uplink signal received by the satellite is one time slot.

As another example, a predetermined time length of a downlink signal is one time slot. When the satellite is moving from the apogee of its orbit towards the perigee, the time length of the downlink signal received by the terminal device is compressed, and the satellite can perform time compensation for the downlink signal, i.e., to increase the signal time length of the downlink signal to ensure that the time length of the downlink signal received by the terminal device is one time slot. When the satellite is moving from the perigee of its orbit towards the apogee, the time length of the downlink signal received by the terminal device is stretched, and the satellite can perform time compensation for the downlink signal, i.e., to decrease the signal time length of the downlink signal to ensure that the time length of the downlink signal received by the terminal device is one time slot.

In another example, when the satellite is moving from the apogee of its orbit towards the perigee, the time for the uplink signal to reach the satellite becomes shorter, and the terminal device can perform time compensation for the TA of the uplink signal, i.e., to decrease the TA of the uplink signal to ensure that the uplink signal can arrive at the satellite at the predetermined time. When the satellite is moving from the perigee of its orbit towards the apogee, the time for the uplink signal to reach the satellite becomes longer, and the terminal device can perform time compensation for the TA of the uplink signal, i.e., to increase the TA of the uplink signal to ensure that the uplink signal can arrive at the satellite at the predetermined time.

In yet another example, when the satellite is moving from the apogee of its orbit towards the perigee, the time for one of two downlink signals that is transmitted later to reach the terminal device becomes shorter, and the satellite can perform time compensation for the TA of the downlink signal that is transmitted later, i.e., to decrease the TA of the downlink signal that is transmitted later to ensure that the downlink signal that is later transmitted can arrive at the terminal device at the predetermined time. When the satellite is moving from the perigee of its orbit to the apogee, the time for one of two downlink signals that is transmitted later to reach the terminal device becomes longer, and the satellite can perform time compensation for the TA of the downlink signal that is transmitted later, i.e., to increase the TA of the downlink signal that is transmitted later to ensure that the downlink signal that is transmitted later can arrive at the terminal device at the predetermined time.

The above examples are all examples in which the transmitter in the NTN determines the time compensation amount for the signal and compensates the signal. Alternatively, the receiver in the NTN can determine the time compensation amount for the signal and compensate the signal.

For example, when the satellite is moving from the apogee of its orbit towards the perigee, the time for the uplink signal to reach the satellite becomes shorter, and the satellite can perform time compensation for the uplink signal, i.e., to detect the uplink signal earlier, or to increase a time window for detecting the uplink signal to avoid missing the uplink signal. When the satellite is moving from the perigee of its orbit to the apogee, the time for the uplink signal to reach the satellite becomes longer, and the satellite can perform time compensation for the uplink signal, i.e., to delay detection of the uplink signal, or to increase a time window for detecting the uplink signal to avoid missing the uplink signal.

In another example, when the satellite is moving from the apogee of its orbit towards the perigee, the time for one of two downlink signals that is transmitted later to reach the terminal device becomes shorter, and the terminal device can perform time compensation for the downlink signal that is transmitted later, i.e., to detect the downlink signal that is transmitted later earlier, or to increase a time window for detecting the downlink signal that is transmitted later to avoid missing the downlink signal that is transmitted later. When the satellite is moving from the perigee of its orbit to the apogee, the time for one of two downlink signals that is transmitted later to reach the terminal device becomes longer, and the terminal device can perform time compensation for the downlink signal transmitted later, i.e., to delay detection of the downlink signal that is transmitted later, or to increase the time window for detecting the downlink signal that is transmitted later to avoid missing the downlink signal that is transmitted later.

It can be seen from the above examples that the apparatus performing the method 300 may be a terminal device (or a chip in the terminal device), or a network device (or a chip in the network device).

When the performing apparatus is a terminal device, the terminal device can receive the Doppler parameter from a satellite or a ground segment (for example, a satellite measurement and control center). When the performing apparatus is a network device, the network device can receive the Doppler parameter from a ground segment (for example, a satellite measurement and control center). Therefore, the apparatus performing the method 300 does not need to calculate the Doppler parameter locally, thereby reducing the burden on the performing apparatus.

The Doppler parameter received by the apparatus performing the method 300 may include one or more parameters. For example, the above Doppler parameter may include a first parameter which is proportional to a change amount of a time length of the signal per time unit.

For example, if the time unit is one time slot, the time length of the signal transmitted by the transmitter is 1 millisecond (ms), and the time length of the signal received by the receiver is 0.98 ms, the change amount of the time length of the signal is 0.02 ms. If the time length of one time slot is 0.5 ms, a change rate of the time length of the signal is 0.01 ms/time slot, and the first parameter can be k*0.01 ms/time slot, where k is a positive number. In this example, the first parameter represents the change rate of the time length of the signal, i.e., the change value of the time length of the signal arriving at the receiver compared with the time length of the signal transmitted by the transmitter per time unit.

In another example, if the time unit is one time slot $T_s$, a TA of a first time slot is 0.05 ms, a TA of the second time slot is 0.06 ms, and the first time slot and the second time slot are two adjacent time slots, then the change value $\Delta_{TA}$ of the TA between the two adjacent time slots is 0.01 ms, and the first parameter may be $\Delta_{TA}/T_s$, that is, 0.01 ms/time slot. In this example, the first parameter represents the change rate of the TA, that is, how much TA should be increased or decreased per time unit to ensure that the uplink signal can reach the satellite at the predetermined time.

In the present disclosure, the time length of the time slot may be 0.5 ms or any other time length, and the present disclosure is not limited to this.

With the first parameter, the terminal device or the satellite can determine the time compensation amount for the signal to ensure that the time length of the signal arriving at the receiver is a predetermined length, and/or that the time at which the signal arrives at the receiver is the predetermined time.

In at least one embodiment, the Doppler parameter may further include a second parameter, which is a change rate of a change amount of a time length of the signal, and the step S320 may include:

determining the change amount of the time length based on the change rate and a time interval between two signals; and determining a second time compensation amount based on a first time compensation amount and the change amount of the time length, the first time compensation amount corresponding to one of the two signals that has an earlier time domain position, and the second time compensation amount corresponding to one of the two signals that has a later time domain position.

The two signals may be, for example, a first signal and a second signal. The first signal may be transmitted at a start time domain position of a first time slot, and the second signal may be transmitted at a start time domain position of a second time slot. The first time slot is adjacent to the second time slot, and the first time slot occurs earlier than the second time slot.

The change rate of the change amount of the time length of the signal may be, for example, 0.01 ms/time slot. That is, the change mount of the time length of the signal in each time slot is 0.01 ms more than the change amount of the time length of the signal in the immediately previous time slot.

For example, in the first time slot, the change amount of the time length of the first signal is 0.02 ms (the signal time length is stretched by 0.02 ms), and the change rate of the change amount of the signal time length is 0.01 ms/time slot. The time interval between the first signal and the second signal is one time slot. Then in the second time slot, the change amount of the time length of the second signal is 0.03 ms. If the time length of one time slot is 0.5 ms, the transmitter needs to transmit the second signal on a time domain resource having a time length of 0.47 ms, so as to ensure that the time length of the second signal received by the receiver is 0.5 ms.

In the above example, 0.02 ms is an example of the first time compensation amount, the interval between the first signal and the second signal (one time slot) is an example of the time interval, 0.01 ms is an example of the change amount of the time length, and 0.03 ms is an example of the second time compensation amount.

In another example, in the first time slot, the change amount of the TA of the first signal is 0.03 ms (the TA time length is stretched by 0.03 ms), and the change rate of the change amount of the signal time length is 0.01 ms/time slot. The time interval between the first signal and the second signal is one time slot. Then in the second time slot, the change amount of the TA of the second signal is 0.04 ms. Since the TA time length is stretched, the terminal device needs to transmit the uplink signal earlier. If the reference TA (TA without Doppler effect) is 0.05 ms, the transmitter needs to transmit the second signal 0.09 ms (i.e., 0.05 ms+0.04 ms) earlier to ensure that the second signal can arrive at the receiver at the predetermined time.

In the above example, 0.03 ms is an example of the first time compensation amount, the interval between the first signal and the second signal (one time slot) is an example of the time interval, 0.01 ms is an example of the change amount of the time length, and 0.04 ms is an example of the second time compensation amount.

In the above solution, a new time compensation amount (i.e., the second time compensation amount) is determined based on an old time compensation amount (i.e., the first time compensation amount) and a change rate of the change amount of the signal time length, such that the adverse impact of the motion of the satellite with variable speed on the time accuracy of the signal can be reduced, especially for scenarios where the satellite is accelerating or decelerating.

In at least one embodiment, the second parameter used for determining the second time compensation amount (i.e., the change rate of the change amount of the signal time length) may be determined according to an equation of:

$$\text{Doppler}_{new} = \text{Doppler}_{old} + (C\Delta'_{Ta}/T_s) \cdot (T_\Delta/T_s)^n,$$

where $\text{Doppler}_{new}$ is the second parameter used for determining the second time compensation amount, $\text{Doppler}_{old}$ is the second parameter used for determining the first time compensation amount, C is a coefficient, $T_s$ is one time slot, $\Delta'_{Ta}$ is a change value of the TA per time unit, $T_\Delta$ is the time interval between the first signal and the second signal, and n is a positive integer.

In the above equation, examples of the values of the respective parameters may be as follows:

$\Delta_{Ta}=480T_c$, $\Delta'_{Ta}=T_c$, $T_s=480\cdot4096T_c$ (i.e., one time slot), C=1, and $T_\Delta=480\cdot10\cdot4096T_c$ (i.e., ten time slots), where $T_c$ is the minimum time unit used by the physical layer interface, which can be equal to 0.509 ns $$\left(\text{i.e., } \frac{1}{480\cdot10^3\cdot4096}\right).$$

In the above equation, for different values of n, the equation corresponding to the second parameter is different. The terminal device may receive first indication information from the satellite or the ground segment, and determine which equation to use according to the first indication information. Alternatively, the satellite may receive the first indication information from the ground segment, and determine which equation to use according to the first indication information. The first indication information may indicate the value of n or an identifier of the equation.

In some cases, the apparatus performing the method 300 also needs to receive a third parameter, which is an adjustment value for the time compensation amount in S320.

For example, if the satellite is hit by space junk and needs to perform an orbit change operation, the terminal device or the satellite can adjust the time compensation amount based on the received adjustment value.

The above adjustment value can be one of $-T_c/T_s$, 0, $T_c/T_s$, $2T_c/T_s$, where $T_c$ is the minimum time unit required by the physical layer interface, which can be equal to 0.509 ns $$\left(\text{i.e., } \frac{1}{480\cdot10^3\cdot4096}\right),$$

a multiple of 0.509 ns, or another value, and $T_s$ is one time slot.

When the adjustment value has a positive sign, it means to increase the time compensation amount; whereas when the adjustment value has a negative sign, it means to decrease the time compensation amount. For example, assuming that the time compensation amount is 0.03 ms, when the adjustment value is 0.01 ms, the terminal device can determine a time compensation amount of 0.04 ms based on the adjustment value, and when the adjustment value is −0.01 ms, the terminal device can determine a time compensation amount of 0.02 ms based on the adjustment value.

The satellite can indicate the specific value of the adjustment value via two bits in first Downlink Control Information (DCI). For example, the above two bits being "00" indicates the adjustment value of $-T_c/T_s$; the above two bits being "01" indicates the adjustment value of 0; the above two bits being "10" indicates the adjustment value of $T_c/T_s$; and the above two bits being "11" indicates the adjustment value of $2T_c/T_s$.

Similarly, the satellite can determine the value of the adjustment value based on the first indication information transmitted by the satellite measurement and control center.

The adjustment value can also be a non-negative number. For example, the adjustment value may be one of 0, $|T_c/T_s|$. The satellite may indicate the sign of the adjustment value via second DCI (for example, 1 bit).

For example, assuming that the adjustment value previously determined by the terminal device is $|T_c/T_s|$, if the terminal device currently receives the second DCI, the terminal device can determine the current adjustment value as $-|T_c/T_s|$. That is, when the second indication information is received, the sign of the adjustment value can be switched.

In another example, assuming that the adjustment value previously determined by the terminal device is $|T_c/T_s|$, if the terminal device does not receive the second DCI currently, the terminal device may determine the current adjustment value as $|T_c/T_s|$. That is, when the second indication information is not received (default state), the sign of the adjustment value is not switched.

In another example, assuming that the adjustment value previously determined by the terminal device is $-|T_c/T_s|$, if the terminal device does not receive the second DCI currently, the terminal device may determine the current adjustment value as $|T_c/T_s|$. That is, when the second indication information is not received (default status), the sign of the adjustment value may be determined as positive (or "negative").

In at least one embodiment, the terminal device may not switch the sign of the adjustment value when the second indication information is received, and switch the sign of the adjustment value when the second indication information is not received.

Similarly, the satellite can also determine the sign of the adjustment value based on whether the second indication information transmitted by the satellite measurement and control center is received.

The solution described above uses a new time compensation amount when determining the TA of the second signal. If the transmitter of the signal does not obtain the new time compensation amount when determining the TA of the second signal, the terminal device can determine the TA of the second signal based on the time compensation amount for the first signal.

For example, when the terminal device does not receive the first indication information and cannot determine which equation to use to calculate the new time compensation amount, or when the terminal device does not receive the third parameter and cannot determine the new time compensation amount based on the adjustment value, the terminal device can determine the TA of the second signal according to $TA_2 = TA_1 + x \cdot \Delta''_{Ta}$, where, $TA_2$ is the TA of the second signal, $TA_1$, is the TA of the first signal, $\Delta''_{Ta}$ is the time compensation amount for the first signal, and x is the number of time slots between the first signal and the second signal.

If the first signal is in time slot 0 and the second signal is in time slot 1, the time interval between the first signal and the second signal is two time slots, i.e., x is equal to 2. If $TA_1$ equals to 0.05 ms, $\Delta''_{Ta}$ equals to 0.01 ms, then $TA_2$ equals to 0.07 ms (0.05 ms+2*0.01 ms). Here, $\Delta''_{Ta}$ is the change value of the TA of the first signal relative to the TA of a third signal, which is a signal adjacent to the time domain position of the first signal. The time domain position of the third signal is earlier than the time domain position of the first signal.

In at least one embodiment, the method 300 may further include: determining a value range of the time compensation amount.

The value range of the time compensation amount can be defined in a communication protocol, or can be dynamically indicated.

For example, the terminal device may receive third indication information from the satellite. The third indication information may indicate the value range of the time compensation amount, and the terminal device may determine the value range of the time compensation amount based on the third indication information. The satellite may also receive the third indication information from the satellite measurement and control center. The third indication information may indicate the value range of the time compensation amount, and the satellite may determine the value range of the time compensation amount based on the third indication information.

For a LEO transparent transmission satellite, the value range of the time compensation amount can be greater than or equal to −40 microseconds per second (μs/sec), and smaller than or equal to 40 μs/sec.

For a LEO base station satellite, the value range of the time compensation amount can be greater than or equal to −20 μs/sec, and smaller than or equal to 20 μs/sec.

For the terminal device, if the determined time compensation amount exceeds a lower bound of the value range, the satellite can be switched.

For example, if the time compensation amount for the LEO base station satellite determined by the terminal device is smaller than −20 μs/sec, the terminal device can switch the base station satellite. Alternatively, the terminal device may also search for a new base station satellite and prepare to switch the base station satellite when the determined time compensation amount for the LEO base station satellite is close to −20 μs/sec.

In at least one embodiment, the terminal device may determine the time compensation amount when the satellite is switched as an upper bound of the value range.

For example, if the initial time compensation amount after the terminal device switches from Satellite A to Satellite B is 15 μs/sec, then the terminal device can determine that 15 μs/sec is the upper bound of the value range of the current time compensation amount.

The example of the communication method according to the present disclosure has been described in detail above. It can be appreciated that, in order to achieve the above functions, the communication apparatus may include hardware structures and/or software modules corresponding to the respective functions. It can be appreciated by those skilled in the art that, given the units and algorithm steps of the examples described in the embodiments disclosed herein, the present disclosure can be implemented in the form of hardware or a combination of hardware and computer software. Whether a certain function is performed by hardware or computer software that drives hardware depends on the specific application and design constraint conditions of the technical solution. Those skilled in the art can use different methods to implement the described functions for each specific application, and such implementation should not be considered as beyond the scope of the present disclosure.

In the present disclosure, the communication apparatus may be divided into functional units according to the above method example. For example, the functions may be divided into functional units, or two or more functions may be integrated into one functional unit. The above functional units can be implemented in the form of hardware or software. It is to be noted that the division of units in the present disclosure is illustrative only, and is only a logical function based division, and there may be other divisions in actual implementations.

Figure 5:
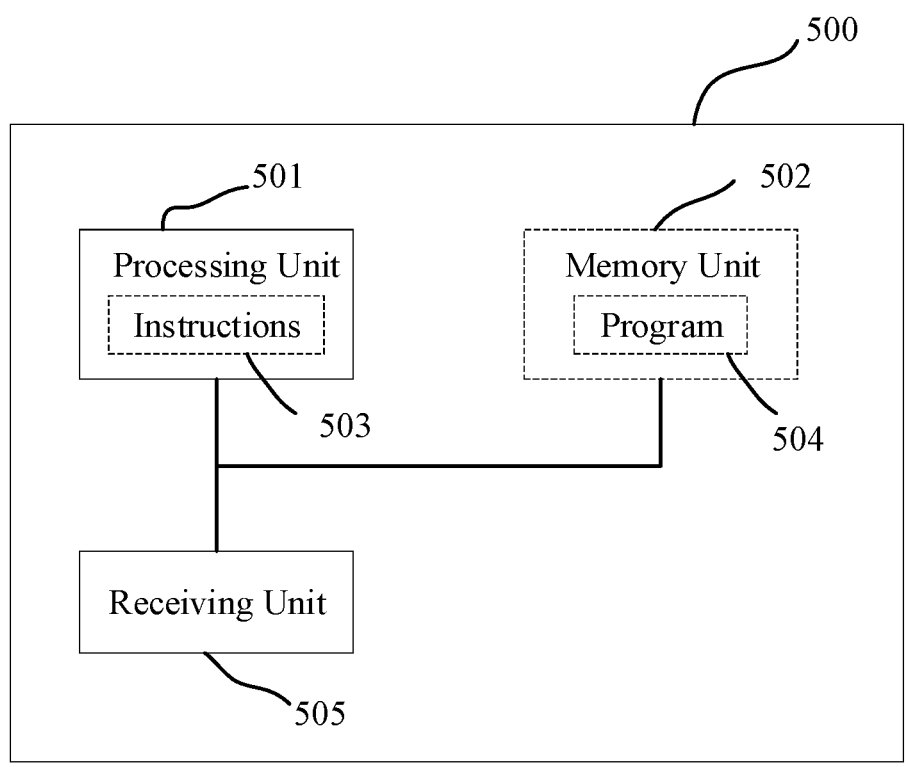
FIG. 5 is a schematic diagram showing a communication apparatus according to the present disclosure.

FIG. 5 shows a schematic structural diagram of a communication apparatus according to the present disclosure. The dotted line in FIG. 5 indicates that a unit is an optional unit. The apparatus 500 may be configured to implement the method described in the above method embodiment. The apparatus 500 may be a software module, a chip, a terminal device, or any other electronic device.

The apparatus 500 includes one or more processing units 501, which can cause the apparatus 500 to implement the method in the method embodiment corresponding to FIG. 3. The processing unit 501 may be a software processing unit, a general-purpose processor, or a special-purpose processor. The processing unit 501 may be configured to control the apparatus 500, execute a software program (for example, a software program including the method 300), and process data (for example, determine a time compensation amount based on a Doppler parameter). The apparatus 500 may further include a receiving unit 505 configured to receive a signal (input).

For example, the apparatus 500 may be a software module, and the receiving unit 505 may be an interface function of the software module. The software module can run on the processor or a control circuit.

In another example, the apparatus 500 may be a chip, and the receiving unit 505 may be an input circuit of the chip, or the receiving unit 505 may be a communication interface of the chip. The chip may be a component of the terminal device or any other electronic device.

In the apparatus 500, the receiving unit 505 may be configured to receive a Doppler parameter.

The processing unit 501 may be configured to determine a time compensation amount for a signal based on the Doppler parameter.

In at least one embodiment, the Doppler parameter may include a first parameter which is proportional to a change amount of a time length of the signal per time unit.

In at least one embodiment, the Doppler parameter includes a first parameter, which is $\Delta_{Ta}/T_s$, where $T_s$ is one time slot and $\Delta_{Ta}$ is a change value of a Timing Advance (TA) between two adjacent time slots.

In at least one embodiment, the Doppler parameter may include a second parameter, which is a change rate of a change amount of a time length of the signal, and the processing unit 501 may be configured to:

determine the change amount of the time length based on the change rate and a time interval between two signals; and determine a second time compensation amount based on a first time compensation amount and the change amount of the time length, the first time compensation amount corresponding to one of the two signals that has an earlier time domain position, and the second time compensation amount corresponding to one of the two signals that has a later time domain position.

In at least one embodiment, the second parameter used for determining the second time compensation amount may be determined according to an equation of:

$$\text{Doppler}_{new} = \text{Doppler}_{old} + (C\Delta'_{Ta}/T_s) \cdot (T_\Delta/T_s)^n,$$

where $\text{Doppler}_{new}$ is the second parameter used for determining the second time compensation amount, $\text{Doppler}_{old}$ is the second parameter used for determining the first time compensation amount, C is a coefficient, $T_s$ is one time slot, $\Delta'_{Ta}$ is a change value of a TA per time unit, $T_\Delta$ is the time interval, and n is a positive integer.

In at least one embodiment, the receiving unit 505 may be further configured to receive first indication information indicating the equation.

In at least one embodiment, the Doppler parameter may include a third parameter which is an adjustment value for the time compensation amount.

In at least one embodiment, the adjustment value may be one of $-T_c/T_s$, 0, $T_c/T_s$ and $2T_c/T_s$, where $T_c$ is a minimum time unit required by a physical layer interface and $T_s$ is a time slot.

In at least one embodiment, the processing unit 501 may be further configured to determine a sign of the adjustment value based on whether second indication information is received, the sign being a positive sign or a negative sign.

In at least one embodiment, the processing unit 501 may be configured to: determine that the sign of the adjustment value is the positive sign when the second indication information is not received; or switch the sign of the adjustment value when the second indication information is received.

In at least one embodiment, the adjustment value may be one of 0, $|T_c/T_s|$ and $|2T_c/T_s|$.

In at least one embodiment, the processing unit 501 may be further configured to determine a value range of the time compensation amount.

In at least one embodiment, the receiving unit 505 may be further configured to receive third indication information indicating the value range of the time compensation amount.

In at least one embodiment, the value range of the time compensation amount may be greater than or equal to −40 microseconds per second (μs/sec), and smaller than or equal to 40 Ξs/sec.

In at least one embodiment, the value range of the time compensation amount may be greater than or equal to −20 μs/sec, and smaller than or equal to 20 μs/sec.

In at least one embodiment, the processing unit 501 may be configured to determine a time compensation amount when the satellite is switched as an upper bound of the value range.

In at least one embodiment, the processing unit 501 may be further configured to switch the satellite when the time compensation amount exceeds a lower bound of the value range.

In at least one embodiment, the processing unit 501 may be further configured to determine a TA of the first signal based on the time compensation amount.

In at least one embodiment, the processing unit 501 may be further configured to determine a TA of the second signal based on the time compensation amount when the time compensation amount is not updated.

In at least one embodiment, the first signal may be in a time slot i, and the second signal may be in a time slot i+x, where i and x are both integers greater than or equal to 0, and the TA of the second signal may be determined according to an equation of:

$TA_2 = TA_1 + x \cdot \Delta''_{Ta}$, where $TA_2$ is the TA of the second signal, $TA_1$ is the TA of the first signal, and $\Delta''_{Ta}$ is the time compensation amount for the first signal.

As an optional implementation, the above steps may be implemented by a logic circuit in the form of hardware or instructions in the form of software. For example, the processing unit 501 may be a Central Processing Unit (CPU), a Digital Signal Processor (DSP), an Application Specific Integrated Circuit (ASIC), a Field Programmable Gate Array (FPGA), or any other programmable logic device, such as a discrete gate, a transistor logic device, or a discrete hardware component.

The apparatus 500 may include one or more memory units 502, in which a program 504 (for example, a software program including the method 300) is stored. The program 504 may be executed by the processing unit 501 to generate instructions 503, such that the processing unit 501 can perform the method described in the above method embodiment according to the instructions 503. In at least one embodiment, the memory unit 502 may also store data (for example, the received Doppler parameter). In at least one embodiment, the processing unit 501 may also read the data stored in the memory unit 502, and the data may be stored at the same storage address as the program 504, or the data may be stored at a different storage address from the program 504.

The processing unit 501 and the memory unit 502 may be provided separately or integrated, for example, integrated on a single board or a System on Chip (SOC).

The present disclosure also provides a computer program product which, when executed by the processing unit 501, implements the method described in any embodiment of the present disclosure.

The computer program product may be stored in the memory unit 502. For example, it may be the program 504, which may be finally converted into an executable object file that can be executed by the processing unit 501 after subjected to processes such as preprocessing, compilation, assembly, and linking.

The computer program product can be transmitted from one computer-readable storage medium to another. For example, it can be transmitted from one website, computer, server, or data center to another web site, computer, server or data center via a wired communication (such as coaxial cable, optical fiber, Digital subscriber line (DSL)) or a wireless connection (such as infrared, radio, microwave, etc.)

The present disclosure also provides a computer-readable storage medium (for example, the memory unit 502) having a computer program stored thereon. The computer program, when executed by a computer, implements the method described in any of the embodiments of the present disclosure. The computer program can be a high-level language program or an executable object program.

The computer-readable storage medium may be a magnetic medium (for example, a floppy disk, a hard disk, or a magnetic tape), an optical medium (for example, a Digital Video Disc (DVD)), or a semiconductor medium (for example, a Solid State Disk (SSD)). For example, the computer-readable storage medium may be a transitory memory or a non-transitory memory, or the computer-readable storage medium may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which can be used as an external cache. As non-limiting examples, various forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM).

It can be appreciated that, in the various embodiments of the present disclosure, the values of the sequence numbers of the above processes does not mean the order in which they are performed. The order in which the respective processes are to be performed should be determined by their functions and internal logics, and should not constitute any limitation on the implementation of the embodiments of the present disclosure.

The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The systems, apparatuses, and methods according to the embodiments of the present disclosure may be implemented in other ways. For example, some features in the above described method embodiments can be ignored or omitted. The apparatus embodiments described above are illustrative only. For example, the divisions of the units are only divisions based on logical functions, and there may be other divisions in actual implementations. For example, more than one unit or component may be combined or integrated into another system. In addition, the coupling between the units or between the components may be direct coupling or indirect coupling, which may be electrical, mechanical, or in any other forms.

In summary, while some embodiments of the present disclosure have been described above, they are not intended to limit the scope of the present disclosure. Any modifications, equivalents and improvements that are made without departing from the spirit and principle of the present disclosure are to be encompassed by the protection scope of the present disclosure.

What is claimed is:

1. A communication method, comprising:
   receiving a Doppler parameter; and
   determining a time compensation amount for a signal based on the Doppler parameter,
   wherein the Doppler parameter comprises a first parameter which is proportional to a change amount of a time length of the signal per time unit, or
   wherein the Doppler parameter comprises a second parameter, which is a change rate of a change amount of a time length of the signal, and wherein said determining the time compensation amount for the signal based on the Doppler parameter comprises: determining the change amount of the time length based on the change rate and a time interval between two signals; and determining a second time compensation amount based on a first time compensation amount and the change amount of the time length, wherein the first time compensation amount corresponds to one of the two signals that has an earlier time domain position, and the second time compensation amount corresponds to one of the two signals that has a later time domain position.

2. The method according to claim 1, wherein the Doppler parameter comprises a first parameter, which is $\Delta_{Ta}/T_s$, where $T_s$ is one time slot and $\Delta_{Ta}$ is a change value of a Timing Advance (TA) between two adjacent time slots.

3. The method according to claim 1, wherein when the Doppler parameter comprises the first parameter which is proportional to the change amount of the time length of the signal per time unit, the Doppler parameter comprises a third parameter which is an adjustment value for the time compensation amount.

4. The method according to claim 3, wherein the adjustment value is one of $-T_c/T_s$, 0, $T_c/T_s$, and $2T_c/T_s$, where $T_c$ is a minimum time unit required by a physical layer interface and $T_s$ is one time slot.

5. The method according to claim 1, further comprising:
determining a value range of the time compensation amount.

6. The method according to claim 5, further comprising:
receiving third indication information indicating the value range of the time compensation amount.

7. The method according to claim 6, wherein the value range of the time compensation amount is:
greater than or equal to −40 microseconds per second (μs/sec), and smaller than or equal to 40 μs/sec.

8. The method according to claim 6, wherein the value range of the time compensation amount is:
greater than or equal to −20 μs/sec, and smaller than or equal to 20 μs/sec.

9. A terminal device, comprising a processor and a memory, the memory is configured to store a computer program, and the processor is configured to invoke and execute the computer program stored in the memory to:
receive a Doppler parameter; and
determine a time compensation amount for a signal based on the Doppler parameter,
wherein the Doppler parameter comprises a first parameter which is proportional to a change amount of a time length of the signal per time unit, or
wherein the Doppler parameter comprises a second parameter, which is a change rate of a change amount of a time length of the signal, and wherein said determining the time compensation amount for the signal based on the Doppler parameter comprises: determining the change amount of the time length based on the change rate and a time interval between two signals; and determining a second time compensation amount based on a first time compensation amount and the change amount of the time length, wherein the first time compensation amount corresponds to one of the two signals that has an earlier time domain position, and the second time compensation amount corresponds to one of the two signals that has a later time domain position.

10. The terminal device according to claim 9, wherein the Doppler parameter comprises a first parameter, which is $\Delta_{Ta}/T_s$, where $T_s$ is one time slot and $\Delta_{Ta}$ is a change value of a Timing Advance (TA) between two adjacent time slots.

11. The terminal device according to claim 9, wherein when the Doppler parameter comprises the first parameter which is proportional to the change amount of the time length of the signal per time unit, the Doppler parameter comprises a third parameter which is an adjustment value for the time compensation amount.

12. The terminal device according to claim 11, wherein the adjustment value is one of $-T_c/T_s$, 0, $T_c/T_s$, and $2T_c/T_s$, where $T_c$ is a minimum time unit required by a physical layer interface and $T_s$ is one time slot.

13. The terminal device according to claim 9, wherein the processor is further configured to invoke and execute the computer program stored in the memory to:
determine a value range of the time compensation amount.

14. The terminal device according to claim 13, wherein the processor is further configured to invoke and execute the computer program stored in the memory to:
receive third indication information indicating the value range of the time compensation amount.

15. The terminal device according to claim 14, wherein the value range of the time compensation amount is:
greater than or equal to −40 microseconds per second (μs/sec), and smaller than or equal to 40 μs/sec.

16. The terminal device according to claim 14, wherein the value range of the time compensation amount is:
greater than or equal to −20 μs/sec, and smaller than or equal to 20 μs/sec.

* * * * *